United States Patent
Iwatsuki et al.

(10) Patent No.: US 8,624,534 B2
(45) Date of Patent: Jan. 7, 2014

(54) CONTROL DEVICE FOR ELECTRIC MOTOR DRIVING APPARATUS

(75) Inventors: Ken Iwatsuki, Anjo (JP); Zhiqian Chen, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 291 days.

(21) Appl. No.: 13/254,279

(22) PCT Filed: Jun. 22, 2010

(86) PCT No.: PCT/JP2010/060567
§ 371 (c)(1),
(2), (4) Date: Sep. 1, 2011

(87) PCT Pub. No.: WO2010/150786
PCT Pub. Date: Dec. 29, 2010

(65) Prior Publication Data
US 2013/0187583 A1 Jul. 25, 2013

(30) Foreign Application Priority Data
Jun. 22, 2009 (JP) .................................. 2009-147830

(51) Int. Cl.
*H02P 1/04* (2006.01)
(52) U.S. Cl.
USPC .................................................. 318/400.17
(58) Field of Classification Search
None
See application file for complete search history.

(56) References Cited

U.S. PATENT DOCUMENTS

2006/0071628 A1* 4/2006 Ta et al. ......................... 318/807
2007/0278986 A1 12/2007 Okamura
2009/0121669 A1* 5/2009 Hanada .......................... 318/504
2009/0128069 A1* 5/2009 Kaneko et al. ............ 318/400.09
2009/0146589 A1* 6/2009 Hattori et al. ............. 318/400.02
2009/0237013 A1* 9/2009 Sato ........................ 318/400.02

FOREIGN PATENT DOCUMENTS

| JP | A-2001-145384 | 5/2001 |
| JP | A-2004-201487 | 7/2004 |
| JP | A-2006-311770 | 11/2006 |

OTHER PUBLICATIONS

International Search Report issued in Application No. PCT/JP2010/060567; Dated Aug. 31, 2010 (With Translation).
Z. Salam, C.J. Goodman: Compensation of Fluctuating DC Link Voltage for Traction Inverter Drive. Sixth International Conference on Power Electronics and Variable Speed Drives, Sep. 25, 1996, 360-395. IEEE [online].
Oct. 2, 2013 Office Action issued in German Patent Application No. 112010000468.4 (with translation).

* cited by examiner

*Primary Examiner* — Lincoln Donovan
*Assistant Examiner* — Zoheb Imtiaz
(74) *Attorney, Agent, or Firm* — Oliff & Berridge, PLC

(57) ABSTRACT

A control device for an electric motor driving apparatus, configured with a switching control unit that performs rectangular wave control in which a plurality of switching elements provided in a direct current-alternating current conversion unit are ON/OFF-controlled to output rectangular wave-shaped voltages of a plurality of phases. System voltage varies during execution of the rectangular wave control, the switching control unit performs rectangular wave width adjustment control to set ON/OFF timings of the plurality of switching elements on the basis of a rate of change of the system voltage such that time-integrated values of the rectangular wave-shaped voltages of the respective phases within a control period set at a length corresponding to an integral multiple of a single electrical angle period are substantially identical among the respective phases.

8 Claims, 9 Drawing Sheets

F I G . 2
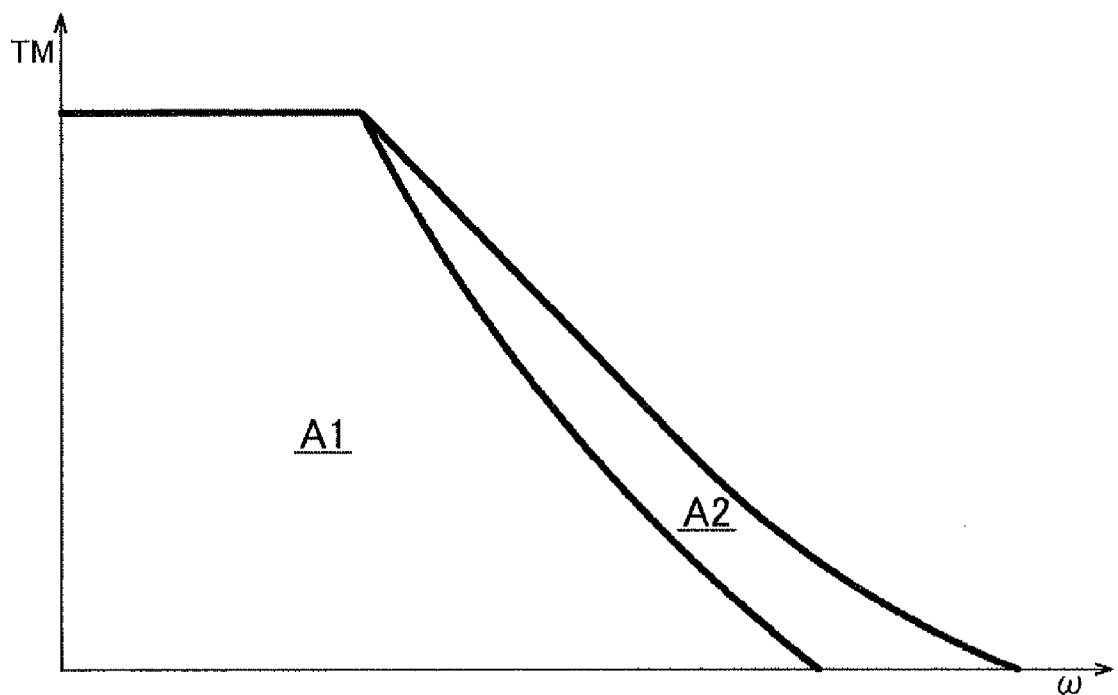

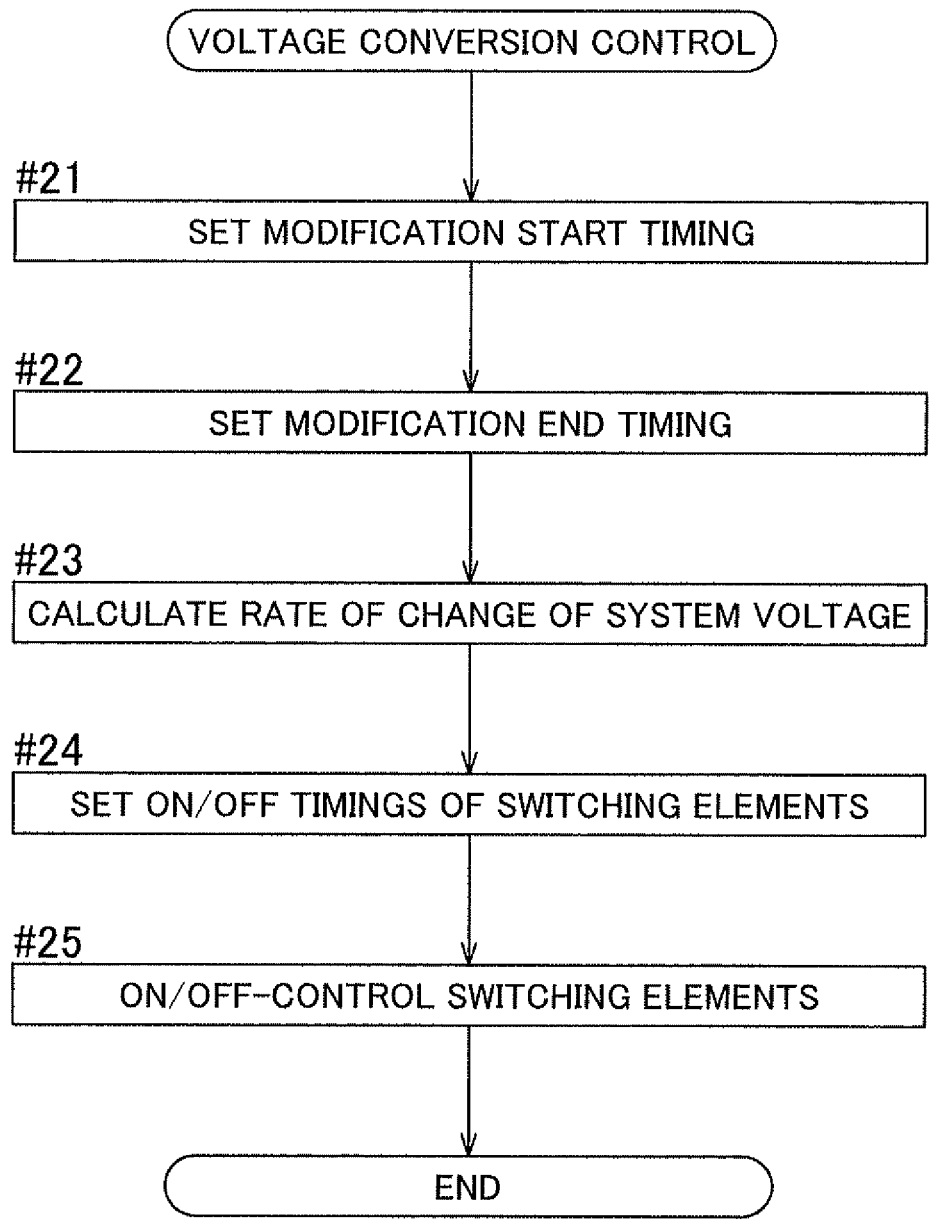

CONTROL DEVICE FOR ELECTRIC MOTOR DRIVING APPARATUS

INCORPORATION BY REFERENCE

The disclosure of Japanese Patent Application No. 2009-147830 filed on Jun. 22, 2009 including the specification, drawings and abstract is incorporated herein by reference in its entirety.

BACKGROUND OF THE INVENTION

The present invention relates to a control device for controlling an electric motor driving apparatus that includes a system voltage generation unit for generating a direct-current system voltage, and a direct current-alternating current conversion unit for converting the system voltage into an alternating current voltage having a plurality of mutually deviating phases and supplying the alternating current voltage to an alternating current electric motor.

DESCRIPTION OF THE RELATED ART

A typically used electric motor driving apparatus drives an alternating current electric motor by converting a direct current voltage from a direct current power supply into an alternating current voltage using an inverter. In this type of electric motor driving apparatus, PWM (Pulse Width Modulation) control and maximum torque control are often performed on the basis of vector control so that torque can be generated efficiently by supplying a sine wave-shaped alternating current voltage to coils of respective phases of the alternating current electric motor. Incidentally, in an alternating current electric motor, an induced voltage increases as a rotation speed increases, leading to an increase in the alternating current voltage (to be referred to hereafter as a "required voltage") required to drive the alternating current electric motor. When the required voltage exceeds a maximum alternating current voltage (to be referred to hereafter as a "maximum output voltage") that can be output from the inverter by converting the system voltage, it becomes impossible to pass a required current through the coils, and as a result, the alternating current electric motor cannot be controlled appropriately. Therefore, field-weakening control for weakening a field magnetic flux of the alternating current electric motor is performed to reduce the induced voltage. However, when field-weakening control is performed, maximum torque control becomes impossible, and therefore a maximum torque that can be output decreases, leading to a reduction in efficiency.

In response to this problem, Japanese Patent Application Publication No. JP-A-2006-311770 (paragraphs 0046 to 0048 and so on), cited below, describes an electric motor driving apparatus that includes a boost converter for boosting a power supply voltage from the direct current power supply and is therefore capable of increasing the system voltage. A control device for controlling this electric motor driving apparatus increases the maximum output voltage by increasing the system voltage in accordance with an increase in the required voltage, and as a result, a maximum torque control region can be expanded to a higher rotation speed region. The control device is constituted to perform rectangular wave control corresponding to the field-weakening control when the rotation speed increases to the extent that the required voltage exceeds the maximum output voltage in a state where the system voltage has reached an upper limit voltage (to be referred to hereafter as a "maximum system voltage") that can be achieved by boosting using the boost converter, or in other words a state where the maximum output voltage has reached its upper limit voltage. Hence, the control device described in JP-A-2006-311770 performs the rectangular wave control after the system voltage becomes equal to the maximum system voltage achieved by boosting the power supply voltage, or in other words after the rotation speed of the alternating current electric motor has become comparatively high.

SUMMARY OF THE INVENTION

Incidentally, with rectangular wave control, the number of times a switching element constituting the inverter is switched ON/OFF can be reduced greatly in comparison with PWM control, and therefore switching loss can be suppressed. Hence, rectangular wave control may be performed from a lower rotation speed region in order to improve the efficiency of the electric motor driving apparatus. However, when the system voltage is boosted during execution of the rectangular wave control, a balance between the voltages supplied to the coils of the respective phases may be disrupted, causing a torque ripple in which the output torque of the alternating current electric motor varies in accordance with a rotation angle. With the constitution described in JP-A-2006-311770, the system voltage is boosted during PWM control and the rectangular wave control is performed after the system voltage has become equal to the maximum system voltage achieved by boosting the power supply voltage. Therefore, the rectangular wave control is not performed until the system voltage is boosted to the maximum system voltage, and as a result, a usage region of the low-switching loss rectangular wave control is limited to a high rotation speed region.

Variation in the system voltage also occurs under operating conditions or in a system where the direct current voltage is supplied as is from the direct current power supply without actively modifying the system voltage using a boost converter. In other words, the output voltage of the direct current power supply varies in accordance with a discharge current or a charging current of the direct current power supply, and the system voltage varies in accordance therewith. If rectangular wave control is not performed during variation of the system voltage, the occurrence of a torque ripple caused by the rectangular wave control can be prevented, but opportunities to execute the low-switching loss rectangular wave control are limited. If rectangular wave control is performed during variation of the system voltage, on the other hand, the low-switching loss rectangular wave control can be executed, but a torque ripple is likely to occur due to the rectangular wave control.

The present invention has been designed in consideration of the problems described above, and an object thereof is to provide a control device for an electric motor driving apparatus which can expand a usage region of rectangular wave control, in which little switching loss occurs, to a low rotation speed region side and suppress vibration in an alternating current electric motor even when a system voltage varies during the rectangular wave control.

To achieve this object, a control device for an electric motor driving apparatus according to the present invention performs control on an electric motor driving apparatus including a system voltage generation unit for generating a direct current system voltage and a direct current-alternating current conversion unit for converting the system voltage into an alternating current voltage having a plurality of mutually deviating phases and supplying the alternating current voltage to an alternating current electric motor, and includes: a switching control unit for performing rectangular wave control in which a plurality of switching elements provided in the direct current-alternating current conversion unit are ON/OFF-controlled to output rectangular wave-shaped voltages of a plurality of phases, wherein, when the system voltage varies during execution of the rectangular wave control, the switching control unit performs rectangular wave width adjustment control to set ON/OFF timings of the plurality of switching elements on the basis of a rate of change of the system voltage such that time-integrated values of the rectangular wave-shaped voltages of the respective phases within a control period set at a length corresponding to an integral multiple of a single electrical angle period are substantially identical among the respective phases.

According to this featured constitution, disruption to a balance between voltages supplied to coils of the respective phases during the control period set at a length corresponding to an integral multiple of a single electrical angle period can be suppressed, thereby suppressing generation of a torque ripple, even when the system voltage varies during execution of the rectangular wave control.

Hence, the rectangular wave control can be performed while suppressing vibration in the alternating current electric motor even when the system voltage varies. As a result, a usage region of the low-switching loss rectangular wave control can be expanded, enabling an improvement in the efficiency of the electric motor driving apparatus.

Further, in a system where the system voltage can be modified by boosting or reducing the system voltage actively using a converter or the like, the system voltage can be modified while suppressing vibration in the alternating current electric motor even during execution of the rectangular wave control, and as a result, the rectangular wave control can be performed from a low rotation speed region in which the system voltage has not yet been boosted to a maximum system voltage. As a result, the usage region of the low-switching loss rectangular wave control can be expanded to the low rotation speed region side, enabling an improvement in the efficiency of the electric motor driving apparatus.

Preferably here, points at which voltage values of the rectangular wave-shaped voltages of the respective phases are switched between a high level and a low level by switching the plurality of switching elements ON and OFF are set as high-low switch points, the switching control unit aligns a start point of the control period with one of the high-low switch points, periods set by dividing the control period using the respective high-low switch points of the rectangular wave-shaped voltages of the plurality of phases as dividing points are set as divided periods, and in the rectangular wave width adjustment control, the ON/OFF timings of the plurality of switching elements are set on the basis of the length of the control period, a value of the system voltage at the start point of the control period, and the rate of change of the system voltage within the control period such that time-integrated values of the system voltage in the respective divided periods are substantially identical.

According to this constitution, the time-integrated values of the rectangular wave-shaped voltages of the respective phases within the control period can be made substantially identical simply by setting the ON/OFF timings of the switching elements on the basis of the length of the control period, the value of the system voltage at the start point of the control period, and the rate of change of the system voltage within the control period such that the time-integrated values of the system voltage in the respective divided periods are substantially identical. Hence, calculations required to execute the rectangular wave width adjustment control can be simplified, and as a result, the constitution of the control device can be simplified.

Note that map data expressing relationships between the aforementioned three parameters and the ON/OFF timings may be prepared in advance, and the ON/OFF timings of the plurality of switching elements may be obtained and set by referring to these map data.

Further, the system voltage generation unit preferably includes a voltage conversion unit that generates a desired system voltage by converting a power supply voltage from a direct current power supply, the control device preferably further includes a voltage conversion control unit that obtains a system voltage command value, which is a command value of the system voltage generated by the voltage conversion unit, and ON/OFF-controls a switching element provided in the voltage conversion unit on the basis of the system voltage command value, when the voltage conversion unit is caused to modify the system voltage, the voltage conversion control unit preferably aligns a modification start timing at which modification of the system voltage is started with one of the ON/OFF timings of the plurality of switching elements provided in the direct current-alternating current conversion unit, and the switching control unit preferably aligns the start point of the control period with the modification start timing.

According to this constitution, the rectangular wave width adjustment control can be performed from an initial point at which modification of the system voltage begins, and in so doing, generation of a torque ripple can be suppressed even more reliably.

Further, the voltage conversion control unit preferably aligns a modification end timing at which modification of the system voltage ends with an ON/OFF timing, from among the ON/OFF timings of the plurality of switching elements provided in the direct current-alternating current conversion unit, that differs from the modification start timing by an integral multiple of a single electrical angle period.

According to this constitution, the rectangular wave width adjustment control can be performed in all of the periods from the modification start timing to the modification end timing, and as a result, generation of a torque ripple can be suppressed even more reliably.

Further, the system voltage is preferably an output voltage of a direct current power supply, and the rate of change of the system voltage is preferably calculated on the basis of a value of the system voltage at the start point of the control period and a value of the system voltage prior to the start point of the control period.

According to this constitution, even when the system voltage, i.e. the output voltage of the direct current power supply, varies in accordance with a discharge current or a charging current, the time-integrated values of the rectangular wave-shaped voltages of the respective phases within the control period can be made substantially identical in accordance with the variation in the system voltage. Hence, even when the system voltage varies unpredictably, the rectangular wave control can be performed appropriately while suppressing vibration in the alternating current electric motor.

BRIEF DESCRIPTION OF THE DRAWINGS

FIG. 2 is a view showing an operable region of an electric motor, which is defined by a rotation speed and a torque;

FIG. 7 is a flowchart showing a flow of voltage conversion control according to the first embodiment of the present invention;

DETAILED DESCRIPTION OF THE EMBODIMENTS

First Embodiment

Figure 1:
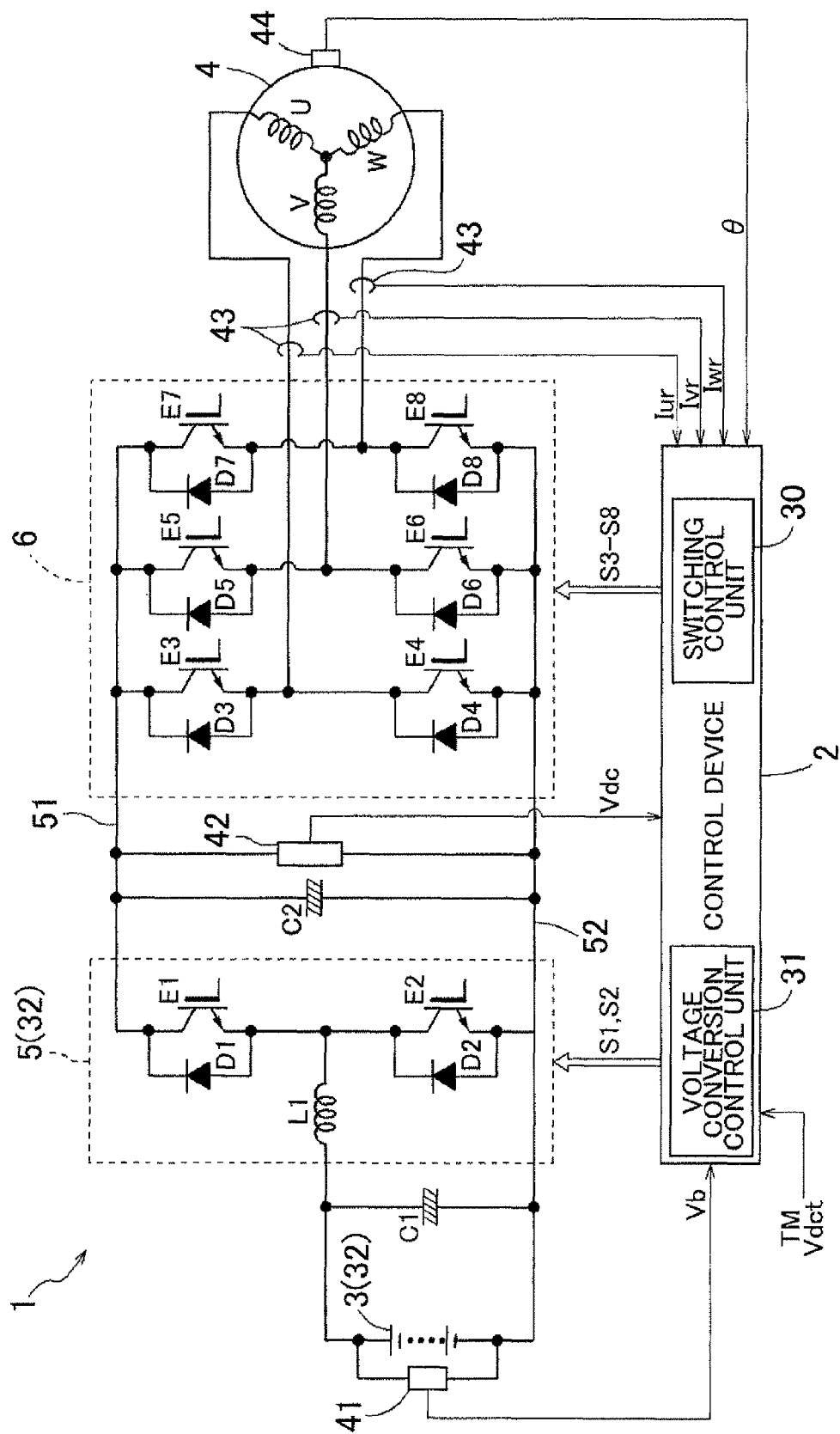
FIG. 1 is a circuit diagram showing the constitution of an electric motor driving apparatus according to a first embodiment of the present invention.

A first embodiment of the present invention will now be described on the basis of the drawings. As shown in FIG. 1, in this embodiment, an example in which an electric motor driving apparatus 1 is constituted by an apparatus for driving a synchronous electric motor 4 having an embedded magnet structure (an IPMSM; to be referred to simply as the "electric motor 4" hereafter), which serves as an alternating current electric motor operated by a three-phase alternating current, will be described. The electric motor 4 also operates as a power generator as required, and is used as a drive power source for an electric vehicle, a hybrid vehicle, or similar, for example. The electric motor driving apparatus 1 includes a system voltage generation unit 32 for generating a direct-current system voltage, and an inverter 6 for converting the system voltage Vdc into an alternating current voltage having three mutually deviating phases and supplying the alternating current voltage to the electric motor 4. In this embodiment, the system voltage generation unit 32 includes a direct current power supply 3, and a converter 5 for converting a power supply voltage Vb from the direct current power supply 3 to generate a desired system voltage Vdc. Further, in this embodiment, a control device 2 is constituted to be capable of controlling the electric motor driving apparatus 1 using a vector control method, ON/OFF-controlling a plurality of switching elements E3 to E8 provided in the inverter 6, and executing rectangular wave control such that a three-phase rectangular wave-shaped voltage is output. A feature of this embodiment is that when the converter 5 modifies the system voltage Vdc during execution of the rectangular wave control, the control device 2 performs rectangular wave width adjustment control for setting ON/OFF timings of the switching elements E3 to E8 on the basis of a rate of change K of the system voltage Vdc such that a time-integrated value of the rectangular wave-shaped voltage of each phase within a control period T set at the length of a single electrical angle period is substantially identical among the respective phases. The electric motor driving apparatus 1 and the control device 2 according to this embodiment will be described in detail below.

1. Constitution of Electric Motor Driving Apparatus

First, the constitution of the electric motor driving apparatus 1 according to this embodiment will be described on the basis of FIG. 1. The electric motor driving apparatus 1 includes the converter 5 and the inverter 6. Further, the electric motor driving apparatus 1 includes the direct current power supply 3, a first smoothing capacitor C1 for smoothing the direct current voltage Vb from the direct current power supply 3, and a second smoothing capacitor C2 for smoothing the system voltage Vdc boosted by the converter 5. Various secondary batteries such as a nickel hydrogen secondary battery or a lithium ion secondary battery, a capacitor, a combination thereof, and so on, for example, may be used as the direct current power supply 3. The power supply voltage Vb, which is the voltage of the direct current power supply 3, is detected by a power supply voltage sensor 41 and output to the control device 2.

The converter 5 is a DC-DC converter that generates the direct current system voltage Vdc at a desired value by converting the power supply voltage Vb from the direct current power supply 3, and corresponds to a voltage conversion unit of the present invention. In this embodiment, the converter 5 functions as a boost converter for generating the desired system voltage Vdc by boosting the power supply voltage Vb. Note that when the electric motor 4 functions as a power generator, the system voltage Vdc from the inverter 6 is reduced and supplied to the direct current power supply 3 to charge the direct current power supply 3. The converter 5 includes a reactor L1, voltage-converting switching elements E1, E2, and diodes D1, D2. Here, the converter 5 includes, as the voltage-converting switching elements, an upper arm element E1 and a lower arm element E2 that form a pair connected in series. In this example, IGBTs (insulated gate bipolar transistors) are used as the voltage-converting switching elements E1, E2. An emitter of the upper arm element E1 and a collector of the lower arm element E2 are connected to a positive electrode terminal of the direct current power supply 3 via the reactor L1. Further, a collector of the upper arm element E1 is connected to a system voltage line 51 to which the voltage boosted by the converter 5 is supplied, and an emitter of the lower arm element E2 is connected to a negative electrode line 52 which is connected to a negative electrode terminal of the direct current power supply 3. Furthermore, the diodes D1, D2, which function as free wheel diodes, are connected in series to the voltage-converting switching elements E1, E2, respectively. Note that instead of IGBTs, power transistors having various structures, such as a bipolar type, a field effect type, and a MOS type, may be employed as the voltage-converting switching elements E1, E2.

The voltage-converting switching elements E1, E2 are ON/OFF-operated respectively in accordance with switching control signals S1, S2 output from the control device 2. In this embodiment, the switching control signals S1, S2 are gate drive signals for driving gates of the respective switching elements E1, E2. Hence, during a boost operation, the converter 5 boosts the power supply voltage Vb supplied from the direct current power supply 3 to the desired system voltage Vdc and supplies the system voltage Vdc to the system voltage line 51 and the inverter 6. Further, during a reduction operation, the converter 5 reduces the system voltage Vdc supplied from the inverter 6 and supplies the reduced system voltage Vdc to the direct current power supply 3. The system voltage Vdc generated by the converter 5 is detected by a system voltage sensor 42 and output to the control device 2.

Note that when a system voltage command value Vdct serving as a command value of the system voltage is equal to the power supply voltage Vb such that boosting by the converter 5 is not required, the system voltage Vdc remains equal to the power supply voltage Vb.

The inverter 6 is a device for converting the direct current system voltage Vdc into an alternating current voltage and supplying the alternating current voltage to the electric motor 4, and corresponds to a direct current-alternating current conversion unit of the present invention. The inverter 6 includes a plurality of sets of switching elements E3 to E8 and diodes D3 to D8. Here, the inverter 6 includes a pair of switching elements for each phase (three phases, namely a U phase, a V phase and a W phase) of the electric motor 4. More specifically, the inverter 6 includes a U phase upper arm element E3 and a U phase lower arm element E4, a V phase upper arm element E5 and a V phase lower arm element E6, and a W phase upper arm element E7 and a W phase lower arm element E8. In this example, IGBTs (insulated gate bipolar transistors) are used as the switching elements E3 to E8. Emitters of the upper arm elements E3, E5, E7 and collectors of the lower arm elements E4, E6, E8 of the respective phases are connected to coils of the respective phases of the electric motor 4. Further, collectors of the upper arm elements E3, E5, E7 of the respective phases are connected to the system voltage line 51, and emitters of the lower arm elements E4, E6, E8 of the respective phases are connected to the negative electrode line 52. Furthermore, the diodes D3 to D8, which function as free wheel diodes, are connected in parallel to the switching elements E3 to E8, respectively. Note that instead of IGBTs, power transistors having various structures, such as a bipolar type, a field effect type, and a MOS type, may be employed as the switching elements E3 to E8.

The switching elements E3 to E8 are ON/OFF-operated respectively in accordance with switching control signals S3 to S8 output from the control device 2. Accordingly, the inverter 6 converts the system voltage Vdc into a three-phase alternating current voltage having mutually deviating phases and supplies the three-phase alternating current voltage to the electric motor 4 to cause the electric motor 4 to output a torque corresponding to a target torque TM. At this time, the respective switching elements E3 to E8 perform switching operations corresponding to PWM (pulse width modulation) control or rectangular wave control, to be described below, in accordance with the switching control signals S3 to S8. In this embodiment, the switching control signals S3 to S8 are gate drive signals for driving gates of the respective switching elements E3 to E8. When the electric motor 4 functions as a power generator, on the other hand, a generated alternating current voltage is converted into a direct current voltage and supplied to the system voltage line 51 and the converter 5. Currents of the respective phases flowing between the inverter 6 and the coils of the respective phases of the electric motor 4, or more specifically a U phase current Iur, a V phase current Ivr, and a W phase current Iwr, are detected by a current sensor 43 and output to the control device 2.

Further, a magnetic pole position θ at each point of a rotor of the electric motor 4 is detected by a rotation sensor 44 and output to the control device 2. The rotation sensor 44 is constituted by a resolver or the like, for example. Here, the magnetic pole position θ expresses a rotation angle of the rotor on an electrical angle. The target torque TM of the electric motor 4 and the system voltage command value Vdct are input into the control device 2 as request signals from another control device such as a vehicle control device, not shown in the drawings, or the like.

2. Constitution of Control Device

Next, functions of the control device 2 according to this embodiment will be described in detail. As shown in FIG. 1, the control device 2 includes a switching control unit 30 and a voltage conversion control unit 31. These function units of the control device 2 are constituted by hardware, software (a program), or both for performing various processing on input data using a logic circuit such as a microcomputer as a core member. As described above, the target torque TM and the magnetic pole position θ are input into the control device 2. The switching control unit 30 then generates and outputs the switching control signals S3 to S8 for driving the electric motor 4 in accordance with the target torque TM, the magnetic pole position θ, and a rotation speed ω of the electric motor 4 derived from the magnetic pole position θ, whereby the inverter 6 is driven. At this time, the control device 2 drives the inverter 6 while switching between either PWM control and maximum torque control or rectangular wave control and field-weakening control. Further, the power supply voltage Vb from the direct current power supply 3, the system voltage Vdc generated by the converter 5, and the system voltage command value Vdct are input into the control device 2. The voltage conversion control unit 31 then generates and outputs the switching control signals S1, S2 for generating an equal system voltage Vdc to the input system voltage command value Vdct, whereby the converter 5 is driven.

During direct current-alternating current conversion in the inverter 6, the switching control unit 30 executes PWM control and rectangular wave control alternately. In this embodiment, the PWM control includes two control methods, namely sine wave PWM control and overmodulation PWM control. In sine wave PWM control, the respective switching elements E3 to E8 of the inverter 6 are ON/OFF-controlled on the basis of a comparison between a sine wave-shaped voltage command value and a carrier wave. More specifically, output voltage waveforms from the inverter 6 in each of the U, V and W phases are constituted by a collection of pulses having a high level period in which the upper arm elements E3, E5, E7 are ON and a low level period in which the lower arm elements E4, E6, E8 are ON, and a duty ratio of each pulse is controlled such that a fundamental wave component thereof forms a sine wave at a fixed period. When a ratio of an effective value of the fundamental wave component of the output voltage waveform from the inverter 6 to the system voltage Vdc is set as a modulation rate m, the modulation rate m can be varied within a range of 0 to 0.61 in the sine wave PWM control. According to this sine wave PWM control, torque control can be performed by executing electric motor current control (electric motor current feedback control) corresponding to vector control, for example.

In the overmodulation PWM control, the switching control unit 30 executes control to distort the waveform of the fundamental wave component of the output voltage waveform from the inverter 6 by increasing the duty ratio of each pulse on a peak side of the fundamental wave component and reducing the duty ratio on a valley side in comparison with the sine wave PWM control, and as a result, an amplitude is increased beyond that of the sine wave PWM control. In the overmodulation PWM control, the modulation rate m can be varied within a range of 0.61 to 0.78. A state in which the modulation rate m has been increased to the maximum 0.78 in the overmodulation PWM control corresponds to rectangular wave control. According to this overmodulation PWM control, torque control can be performed by executing electric motor current control (electric motor current feedback control) corresponding to vector control, for example.

The switching control unit 30 performs rectangular wave control such that the output voltage waveforms from the inverter 6 in each of the U, V and W phases form rectangular waves in which the high level period and the low level period appear once each in a single period and a ratio between the high level period and the low level period is basically 1:1. Hence, the rectangular wave control causes the inverter 6 to output a rectangular wave-shaped voltage. In other words, the switching control unit 30 is a control unit which performs both the PWM control described above and rectangular wave control for ON/OFF-controlling the plurality of switching elements E3 to E8 provided in the inverter 6 such that a three-phase rectangular wave-shaped voltage is output. In the rectangular wave control, the modulation rate m is fixed at 0.78. According to the rectangular wave control, torque control can be performed through voltage phase control (torque feedback control) based on a deviation between a torque performance value, which is determined by a power calculation using the current values Iur, Ivr, Iwr of the respective U, V and W phases detected by the current sensor 43 and a voltage command value, and a torque command value, for example. Further, torque control can be performed by executing electric motor current control (electric motor current feedback control) corresponding to vector control. Note that the sine wave PWM control, overmodulation PWM control, and rectangular wave control performed by the switching control unit 30 are well known, and therefore detailed description thereof has been omitted here (see JP-A-2006-311770, for example).

Incidentally, in the electric motor 4, the induced voltage increases as the rotation speed increases, leading to an increase in the alternating current voltage (to be referred to hereafter as a "required voltage") required to drive the electric motor 4. When the required voltage exceeds a maximum alternating current voltage (to be referred to hereafter as a "maximum output voltage") that can be output from the inverter 6 following conversion of the system voltage Vdc at that time, a required current cannot be passed through the coils, and as a result, the electric motor 4 cannot be controlled appropriately. Hence, in this embodiment, maximum torque control is performed together with the PWM control in a state where the modulation rate m of the PWM control (the sine wave PWM control or the overmodulation PWM control) is varied within a range of 0 to 0.78 in accordance with the required voltage of the electric motor 4 and the required voltage of the electric motor 4 is lower than the maximum output voltage in that range. When the required voltage of the electric motor 4 reaches the maximum output voltage at the maximum modulation rate (m=0.78) of the PWM control, rectangular wave control and field-weakening control are performed. Here, the maximum torque control is control for adjusting the current phase such that an output torque of the electric motor 4 reaches a maximum relative to a constant current. Further, the field-weakening control is control for adjusting (advancing) the current phase such that magnetic flux is generated from the coils in a direction for weakening a field magnetic flux of the electric motor 4. The required voltage and the maximum output voltage can be compared to each other as effective values of the alternating current voltage. Note that the maximum torque control and field-weakening control are well known and therefore detailed description thereof has been omitted here (see JP-A-2006-311770, for example).

FIG. 2 is a view showing a region A1, in which PWM control and maximum torque control are executed, and a region A2, in which rectangular wave control and field-weakening control are executed, within an operable region of the electric motor 4 defined by the rotation speed ω and the target torque TM. Note that FIG. 2 does not take into account boosting of the system voltage Vdc. As noted above, the induced voltage of the electric motor 4 increases as the rotation speed ω increases, and therefore the required voltage of the electric motor 4 increases correspondingly. Hence, when an operating point defined by the target torque TM input into the control device 2 and the rotation speed ω of the electric motor 4 at that time is positioned within the comparatively low rotation region A1, PWM control and maximum torque control are executed, and when the operating point is positioned within the comparatively high rotation region A2, rectangular wave control and field-weakening control are executed. A boundary between the region A1 and the region A2 is determined by the rotation speed ω and the torque at which the required voltage of the electric motor 4 matches the maximum output voltage at the maximum modulation rate of the PWM control (i.e. the modulation rate m=0.78 at which rectangular wave control begins).

The voltage conversion control unit 31 is a control unit for obtaining the system voltage command value Vdct serving as the command value of the system voltage Vdc generated by the converter 5, and performing ON/OFF control on the switching elements E1, E2 provided in the converter 5 on the basis of the system voltage command value Vdct. The voltage conversion control unit 31 generates the switching control signals S1, S2 for controlling the voltage-converting switching elements E1, E2 of the converter 5 in accordance with the obtained system voltage command value Vdct. By ON/OFF-operating the voltage-converting switching elements E1, E2 of the converter 5 in accordance with the switching control signals S1, S2, the power supply voltage Vb is boosted. More specifically, in response to the switching control signals S1, S2 from the voltage conversion control unit 31, the converter 5 boosts the power supply voltage Vb by performing an operation to switch repeatedly and alternately between a state in which only the lower arm element E2 is ON for a predetermined period and a state in which both the upper arm element E1 and the lower arm element E2 are OFF for a predetermined period. A boost ratio at this time corresponds to a duty ratio of the ON period of the lower arm element E2. In other words, power accumulation in the reactor L1 increases as the ON duty of the lower arm element E2 increases, and therefore the system voltage Vdc output from the converter 5 can be increased. Note that in addition to the system voltage command value Vdct, the power supply voltage Vb and the system voltage Vdc are also input into the control device 2. On the basis of the system voltage command value Vdct and the system voltage Vdc or the system voltage command value Vdct, the system voltage Vdc and the power supply voltage Vb, the voltage conversion control unit 31 performs feedback control to cause the converter 5 to generate an equal system voltage Vdc to the system voltage command value Vdct.

Figure 3A:
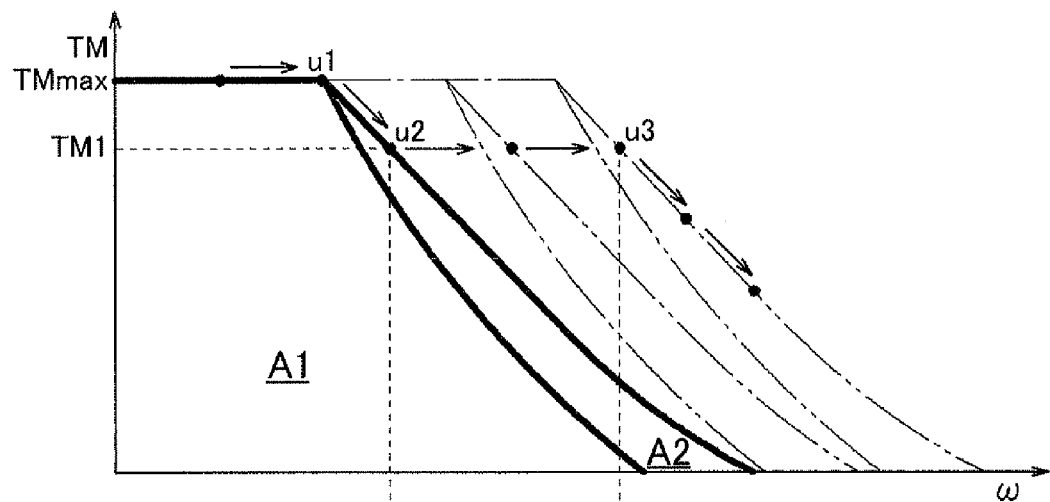
FIG. 3 is an illustrative view showing variation in a system voltage command value and accompanying variation in the operable region of the electric motor, according to the first embodiment of the present invention.
Figure 3B:
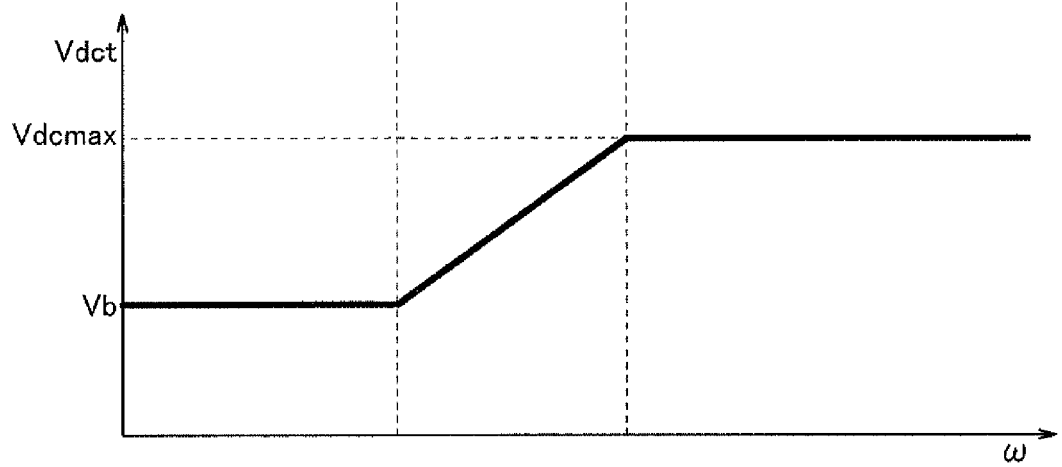

FIG. 3 is an illustrative view showing an example of variation in the system voltage command value Vdct and accompanying variation in the operable region of the electric motor 4. FIG. 3B shows an example of variation in the system voltage command value Vdct when the rotation speed ω increases, and FIG. 3A shows variation in the operable region of the electric motor 4 corresponding to this variation in the system voltage command value Vdct. In FIG. 3A, a region indicated by a solid line is the operable region in a case where the power supply voltage Vb is used as the system voltage Vdc as is, i.e. without being boosted, while regions indicated by dot-dot-dash lines are operable regions that vary as the power supply voltage Vb is gradually boosted. Further, a plurality of black dots in FIG. 3A indicate a course of the target torque TM.

As shown in FIG. 3A, in this example, the operating point of the electric motor 4 defined by the target torque TM and the rotation speed ω remains in the region A1, in which the maximum torque control and the PWM control can be executed without the need to boost the power supply voltage Vb, until a time u1. Accordingly, the control device 2 executes the maximum torque control and the PWM control.

From the time u1 to a time u2, as shown in FIG. 3A, the operating point of the electric motor 4 enters the region A2 in which the field-weakening control and the rectangular wave control are required, and therefore the control device 2 executes the field-weakening control and the rectangular wave control. At this time, the control device 2 does not perform boost control, and therefore the system voltage command value Vdct remains at an identical value to the power supply voltage Vb. Hence, the torque that can be output by the electric motor 4 decreases gradually as the rotation speed ω increases.

From the time u2 to a time u3, as shown in FIG. 3B, the control device 2 executes the boost control. As a result, the system voltage command value Vdct increases gradually from the same value as the power supply voltage Vb to a value Vdcmax set as an upper limit of the system voltage command value Vdct in accordance with increases in the rotation speed ω from the time u2 to the time u3. Note that Vdcmax, which serves as the upper limit value of the system voltage command value Vdct, is preferably set at an upper limit value of the system voltage Vdc achievable through boosting by the converter 5. When the system voltage Vdc increases in this manner, the operable region of the electric motor 4 gradually expands to the high rotation side, as shown in FIG. 3A. In this example, when the system voltage command value Vdct is boosted in accordance with an increase in the rotation speed ω of the electric motor 4, the torque that can be output by the electric motor 4 remains constant even as the rotation speed ω increases. Note that a relationship between the rotation speed ω of the electric motor 4 and the torque that can be output by the electric motor 4 varies during the boost control according to a relationship between a boosting speed and an acceleration of the rotor of the electric motor 4. The control device 2 continues to execute the field-weakening control and the rectangular wave control during the boost control. In this example, the system voltage command value Vdct reaches the upper limit value thereof Vdcmax at the time u3. From the time u3 onward, the torque that can be output by the electric motor 4 gradually decreases as the rotation speed ω increases. Needless to say, the control device 2 continues to execute the field-weakening control and the rectangular wave control during this period also.

As described above, with the control device 2 according to this embodiment, the field-weakening control and the rectangular wave control are started (time u1 to time u2) before performing the boost control in a condition where the rotation speed ω of the electric motor 4 and the target torque TM are increasing. When the rotation speed ω and the target torque TM subsequently increase further, the system voltage Vdc is boosted while maintaining the field-weakening control and the rectangular wave control. Hence, switching loss generated by the rectangular wave control can be reduced over a wide operating range, enabling an improvement in the efficiency of the electric motor driving apparatus 1. Further, once the system voltage command value Vdct has reached the upper limit value thereof Vdcmax, the rotation speed ω of the electric motor 4 can be increased even further by increasing a field-weakening current.

3. Operation of Control Device

Next, an operation of the control device 2 will be described. As described above, in this embodiment, the control device 2 continues to execute the rectangular wave control during boost control by the converter 5. When the converter 5 modifies the system voltage Vdc during execution of the rectangular wave control, the switching control unit 30 executes rectangular wave width adjustment control for setting the ON/OFF timings of the switching elements E3 to E8 on the basis of the rate of change K of the system voltage Vdc such that time-integrated values of the rectangular wave-shaped voltages of the three phases within the control period T set at the length of a single electrical angle period are substantially identical among the respective phases. An overall operation of the control device 2, the rectangular wave width adjustment control, and voltage conversion control will be described in sequence below.

3-1. Overall Operation

Figure 4:
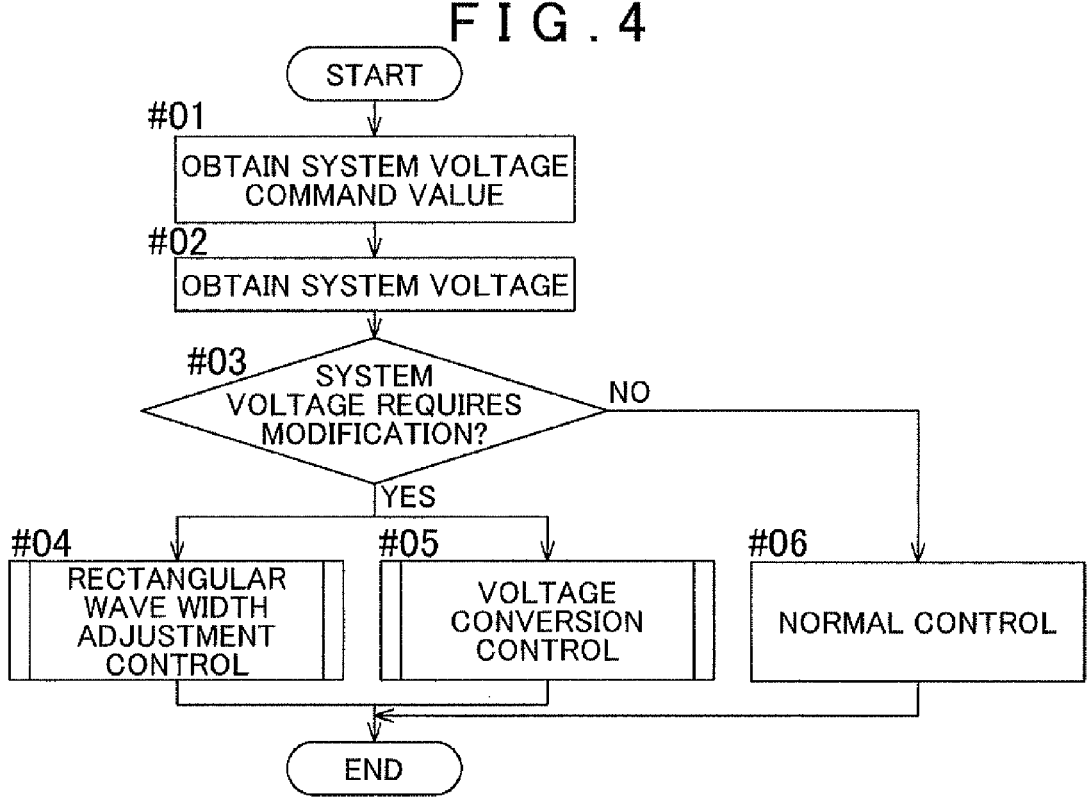
FIG. 4 is a flowchart showing a control flow of a control device according to the first embodiment of the present invention.

FIG. 4 is a flowchart showing the flow of an overall operation performed by the control device 2 during the rectangular wave control. Operations of the control device 2 will be described in sequence below while following the flowchart shown in FIG. 4. First, the control device 2 obtains the system voltage command value Vdct (step #01) and the system voltage Vdc (step #02). The control device 2 then determines whether or not the system voltage Vdc needs to be modified by comparing the system voltage command value Vdct to the system voltage Vdc (step #03). Here, it is determined that the system voltage Vdc needs to be modified when a difference of at least a fixed value exists between the system voltage command value Vdct and the system voltage Vdc. The fixed value is preferably determined in accordance with an error included in the system voltage Vdc obtained by the system voltage sensor 42, a variation width of the system voltage Vdc when the system voltage Vdc is not modified, and so on. When the system voltage Vdc needs to be modified (step #03: Yes), the switching control unit 30 performs the rectangular wave width adjustment control to be described below (step #04), and the voltage conversion control unit 31 performs the voltage conversion control to be described below (step #05), When the system voltage Vdc does not need to be modified (step #03: No), on the other hand, normal control is performed (step #06). Here, normal control is control performed to obtain a rectangular wave in which the ratio between the high level period and the low level period of the rectangular wave-shaped voltage is 1:1.

3-2. Rectangular Wave Width Adjustment Control

Figure 5:
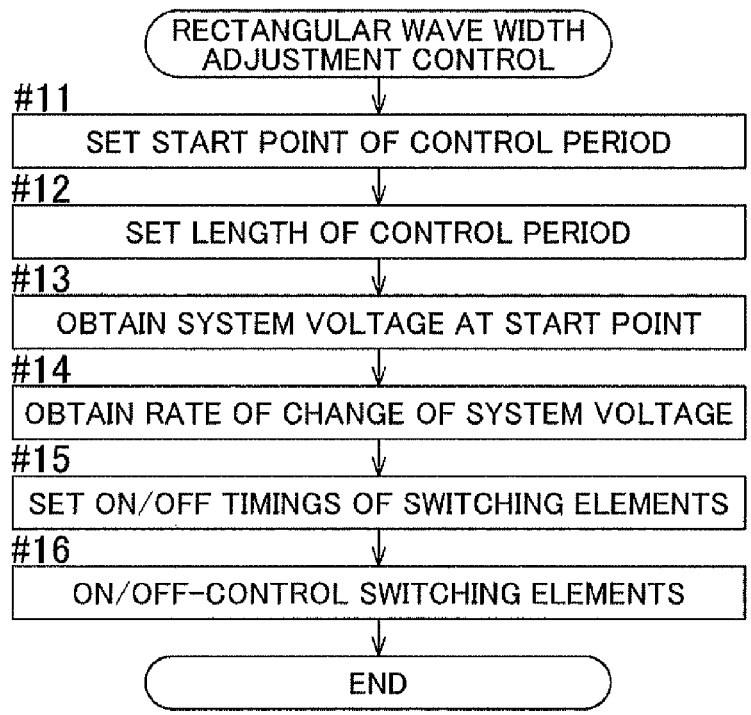
FIG. 5 is a flowchart showing a flow of rectangular wave width adjustment control.

Next, the rectangular wave width adjustment control corresponding to the step #04 of the flowchart in FIG. 4 will be described in detail using FIGS. 5 and 6. FIG. 5 is a flowchart showing the flow of the rectangular wave width adjustment control, and FIG. 6 is an illustrative view illustrating setting of the ON/OFF timings of the switching elements E3 to E8, which is executed in the rectangular wave width adjustment control. Note that in this example, the system voltage Vdc is boosted. More specifically, this example corresponds to a case in which the system voltage Vdc is boosted at a constant rate of change K. Although omitted from the description, the ON/OFF timings of the switching elements E3 to E8 can be set similarly using the following procedures in a case where the system voltage Vdc is reduced.

Figure 6A:
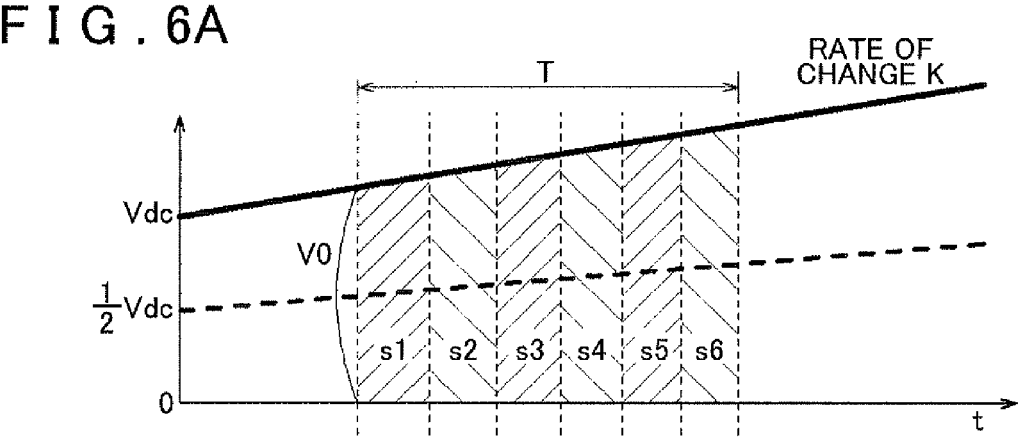
FIG. 6 is an illustrative view illustrating setting of ON/OFF timings of switching elements, which is executed in the rectangular wave width adjustment control.
Figure 6B:
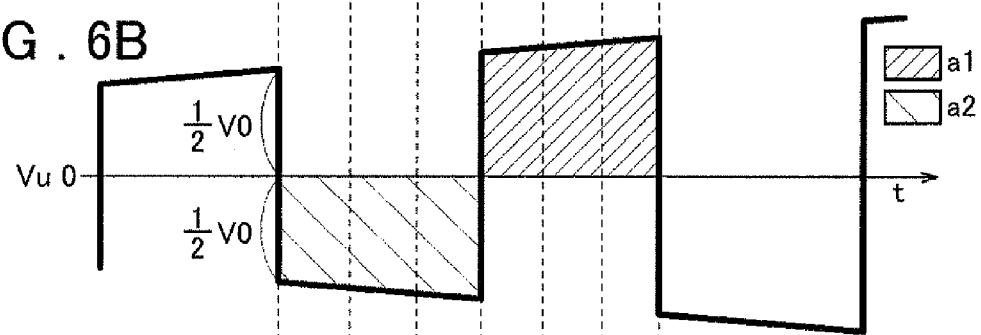
Figure 6C:
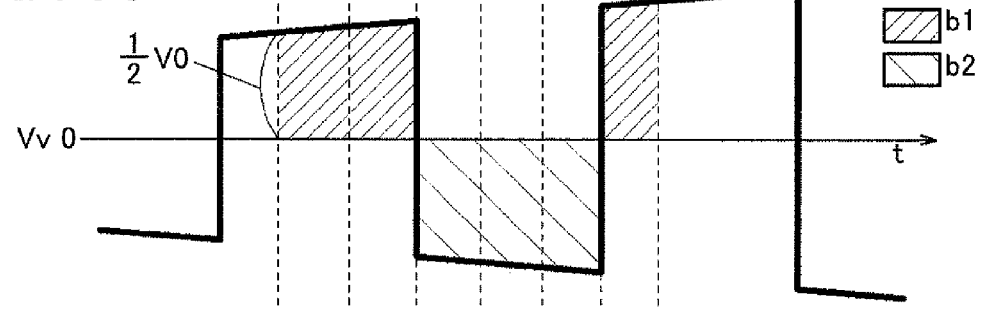
Figure 6D:
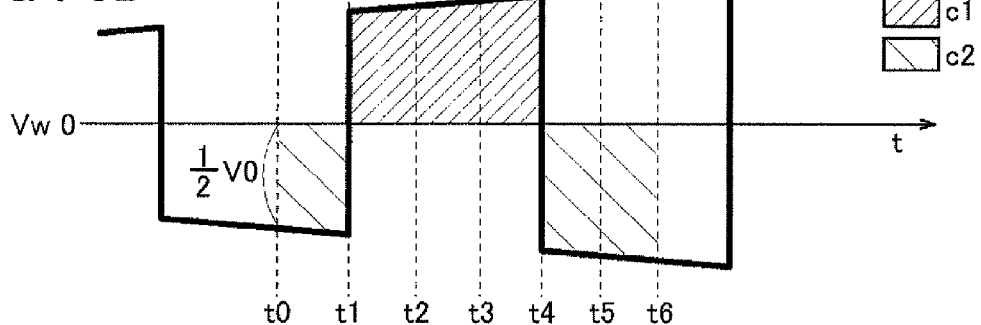

FIG. 6A is a view showing temporal variation in the system voltage Vdc. FIG. 6B is a view showing temporal variation in a U phase voltage Vu supplied to a U phase coil. FIG. 6C is a view showing temporal variation in a V phase voltage Vv supplied to a V phase coil. FIG. 6D is a view showing temporal variation in a W phase voltage Vw supplied to a W phase coil. Note that in FIGS. 6B to 6D, voltages of the respective U, V, W phases are expressed using a half value (Vdc/2) of the system voltage Vdc at each point in time as a reference. Accordingly, the voltages Vu, Vv, Vw of the respective phases form rectangular waves having 0 as a center, a voltage value of (+Vdc/2) in the high level period, and a voltage value of (−Vdc/2) in the low level period. Further, in the high level period, the voltage value of each phase increases on a gradient of (K/2), while in the low level period, the voltage value of each phase decreases on a gradient of (−K/2).

The rectangular wave width adjustment control is control performed by the switching control unit 30 when the converter 5 modifies the system voltage Vdc during execution of the rectangular wave control. In the rectangular wave width adjustment control, the ON/OFF timings of the plurality of switching elements E3 to E8 are set on the basis of the rate of change K of the system voltage Vdc such that a time-integrated value of the rectangular wave-shaped voltages of the three phases within the control period T set at the length of a single electrical angle period is substantially identical among the respective phases. Note that in the following description, a point at which a voltage value of the rectangular wave-shaped voltage of each phase switches between a high level and a low level as the switching elements E3 to E8 are switched ON and OFF will be referred to as a high/low switch point.

In this embodiment, when the rectangular wave width adjustment control is performed, the switching control unit 30 aligns a start point of the control period T with one of the high/low switch points. The ON/OFF timings of the switching elements E3 to E8 are then set on the basis of the length of the control period T, the value of the system voltage Vdc at the start point of the control period T, and the rate of change K of the system voltage Vdc during the control period T such that the time-integrated value of the system voltage Vdc is substantially identical in respective divided periods. Here, the divided periods are periods set by dividing the control period T using the respective high/low switch points of the rectangular wave-shaped voltages of the three phases as dividing points. Operations of the switching control unit 30 will be described below in sequence following the flowchart shown in FIG. 5, with appropriate reference to FIG. 6.

First, the switching control unit 30 sets the start point of the control period T (step #11). In the example shown in FIG. 6, the start point of the control period T is set at a time t0. The time t0 is the high/low switch point of the U phase voltage Vu. More specifically, the time t0 is a time at which the U phase upper arm element E3 is switched from an ON state to an OFF state and the U phase lower arm element E4 is switched from an OFF state to an ON state, whereby the U phase voltage Vu is switched from the high level to the low level. Next, the length of the control period T is set (step #12). In this embodiment, the control period T is set at the length of a single electrical angle period, and in the example shown in FIG. 6, the length of the control period T is (t6-t0). In other words, in this example, an end point of the control period T is a time t6. The time t6 corresponds to a high/low switch point of the U phase voltage Vu at which, similarly to the time t1, the U phase voltage Vu is switched from the high level to the low level.

Next, the system voltage Vdc at the start point (the time t0 in this example) of the control period T is obtained (step #13). In the example shown in FIG. 6, this value is V0. Next, the rate of change K of the system voltage Vdc is obtained (step #14).

In this embodiment, the voltage conversion control unit 31 calculates the rate of change K of the system voltage Vdc and inputs the calculated rate of change K into the switching control unit 30. The switching control unit 30 then sets the ON/OFF timings of the switching elements E3 to E8 on the basis of the length (t6-t0) of the control period T, the value V0 of the system voltage Vdc at the start point t0 of the control period T, and the rate of change K of the system voltage Vdc during the control period T such that the time-integrated value of the system voltage Vdc is substantially identical in the respective divided periods (step #15).

Setting of the ON/OFF timings of the switching elements E3 to E8 will now be described in detail. In the example shown in FIG. 6, six divided periods exist within the control period T. These six divided periods are "t0-t1", "t1-t2", "t2-t3", "t3-t4", "t4-t5", and "t5-t6". Note that "tm-tn" indicates a period extending from a time tm to a time tn. At the time t1, the W phase upper arm element E7 is switched from an OFF state to an ON state and the W phase lower arm element E8 is switched from an ON state to an OFF state, whereby the W phase voltage Vw is switched from the low level to the high level. At the time t2, the V phase upper arm element E5 is switched from an ON state to an OFF state and the V phase lower arm element E6 is switched from an OFF state to an ON state, whereby the V phase voltage Vv is switched from the high level to the low level. At the time t3, the U phase upper arm element E3 is switched from an OFF state to an ON state and the U phase lower arm element E4 is switched from an ON state to an OFF state, whereby the U phase voltage Vu is switched from the low level to the high level. At the time t4, the W phase upper arm element E7 is switched from an ON state to an OFF state and the W phase lower arm element E8 is switched from an OFF state to an ON state, whereby the W phase voltage Vw is switched from the high level to the low level. At the time t5, the V phase upper arm element E5 is switched from an OFF state to an ON state and the V phase lower arm element E6 is switched from an ON state to an OFF state, whereby the V phase voltage Vv is switched from the low level to the high level.

Further, the times t1 to t5 for determining the ON/OFF timings (the high-low switch points of the respective phases) of the switching elements E3 to E8 are set such that the time-integrated values of the system voltages Vdc in the respective divided periods are equal to each other. In FIG. 6A, surface areas of sections defined by the length of each divided period and the system voltage Vdc in the corresponding divided period are expressed by s1 to s6 in the respective divided periods. These surface areas s1 to s6 are equal to the time-integrated values of the system voltages Vdc in the respective divided periods. Hence, the switching control unit 30 sets the times t1 to t5 such that the surface areas s1 to s6 are equal to each other. These times tn (n=1, 2 . . . 5) may be determined as times tn that satisfy a following Equation (1), for example.

$$\{V0+K\times(tn-t0)/2\}\times(tn-t0)\times(6/n)=(V0+K\times T/2)\times T \quad (1)$$

Needless to say, the times t1 to t5 may be calculated on the basis of a different equation to Equation (1). Further, map data expressing relationships between the length of the control period T, the value of the system voltage Vdc at the start point of the control period T, the rate of change K of the system voltage Vdc during the control period T, and the ON/OFF timings of the switching elements E3 to E8 may be prepared in advance, and the ON/OFF timings of the switching elements E3 to E8 may be obtained and set by referring to these map data.

When the times tn (n=1, 2 ... 5) are set in the above manner, the time-integrated values of the rectangular wave-shaped voltages of the respective U, V, W phases within the control period T can be made substantially identical among the respective phases, as shown in FIGS. 6B to 6D. In other words, as shown in FIG. 6B, with regard to the U phase voltage Vu, the surface areas of the sections defined by the length of each divided period and the U phase voltage Vu in the corresponding divided period become equal to each other in all of the six divided periods. More specifically, since the surface area of each section is identical, a sum (a1) of the surface areas corresponding to the high level period and a sum (a2) of the surface areas corresponding to the low level period are both three times the surface area of each section, and therefore the surface area a1 and the surface area a2 are equal. In other words, an integrated value of the U phase voltage Vu in the high level period is equal to the surface area a1, while an integrated value of the U phase voltage Vu in the low level period is equal to a value obtained by multiplying (−1) by the surface area a2. Since the surface area a1 and the surface area a2 are equal, the time-integrated value of the rectangular wave-shaped voltage Vu of the U phase in the control period T is zero.

Further, as shown in FIG. 6C, with regard to the V phase voltage Vv, the surface areas of the sections defined by the length of each divided period and the V phase voltage Vv in the corresponding divided period are equal to each other in all of the six divided periods. More specifically, since the surface area of each section is identical, a sum (b1) of the surface areas corresponding to the high level period and a sum (b2) of the surface areas corresponding to the low level period are both three times the surface area of each section, and therefore the surface area b1 and the surface area b2 are equal. In other words, an integrated value of the V phase voltage Vv in the high level period is equal to the surface area b1, while an integrated value of the V phase voltage Vv in the low level period is equal to a value obtained by multiplying (−1) by the surface area b2. Since the surface area b1 and the surface area b2 are equal, the time-integrated value of the rectangular wave-shaped voltage Vv of the V phase in the control period T is zero.

Furthermore, as shown in FIG. 6D, with regard to the W phase voltage Vw, the surface areas of the sections defined by the length of each divided period and the W phase voltage Vw in the corresponding divided period are equal to each other in all of the six divided periods. More specifically, since the surface area of each section is identical, a sum (c1) of the surface areas corresponding to the high level period and a sum (c2) of the surface areas corresponding to the low level period are both three times the surface area of each section, and therefore the surface area c1 and the surface area c2 are equal. In other words, an integrated value of the W phase voltage Vw in the high level period is equal to the surface area c1, while an integrated value of the W phase voltage Vw in the low level period is equal to a value obtained by multiplying (−1) by the surface area c2. Since the surface area c1 and the surface area c2 are equal, the time-integrated value of the rectangular wave-shaped voltage Vw of the W phase in the control period T is zero. Hence, with regard to each of the U, V and W phases in the control period T, the surface areas of the sections corresponding to the respective divided periods are equal to each other in relation to the same phase and the other phases, and therefore the time-integrated values of the rectangular wave-shaped voltages are identical among the respective phases.

By setting the times t1 to t5 as described above, the ON/OFF timings of the plurality of switching elements E3 to E8 can be set such that the time-integrated value of the rectangular wave-shaped voltages of each of the U, V and W phases within the control period T is substantially identical in each phase. ON-OFF-control is therefore performed on the switching elements E3 to E8 within the control period T in accordance with the ON/OFF timings of the switching elements E3 to E8 set in the above manner (step #16).

As described above, in this embodiment, the ON/OFF timings of the switching elements E3 to E8 are set such that the time-integrated values of the system voltages Vdc in the respective divided periods are substantially identical, and therefore the time-integrated values of the rectangular wave-shaped voltages of the three phases within the control period T can be made substantially identical in each phase. As a result, disruption to a balance between the voltages Vu, Vv, Vw supplied to the coils of the respective phases during the control period T can be suppressed, thereby suppressing generation of a torque ripple. Hence, the system voltage Vdc can be modified while suppressing vibration in the electric motor 4 even during execution of the rectangular wave control, and as shown above in FIG. 3, rectangular wave control can be performed from the low rotation speed region in which the system voltage Vdc has not yet been boosted to the maximum system voltage Vdcmax. As a result, the usage region of the low-switching loss rectangular wave control can be expanded to the low rotation speed region side, enabling an improvement in the efficiency of the electric motor driving apparatus 1.

Note that here, as shown in FIG. 6A, only rectangular wave width adjustment control performed in the control period T set between the time t0 and the time t6 when the system voltage Vdc increases at the constant rate of change K was described. However, the time-integrated values of the rectangular wave-shaped voltages of the three phases within the control period T may be made substantially identical in each phase by setting the ON/OFF timings of the switching elements E3 to E8 such that the time-integrated values of the system voltages Vdc in the respective divided periods are substantially identical even when the system voltage Vdc increases at a rate of change K that varies during the control period rather than the constant rate of change K. Further, in a condition where the system voltage Vdc varies continuously, the control period T may be set repeatedly such that the end point of the control period T and the start point of the next control period T match, and the rectangular wave width adjustment control may be performed repeatedly in these respective control periods T.

3-3. Voltage Conversion Control

Figure 8A:
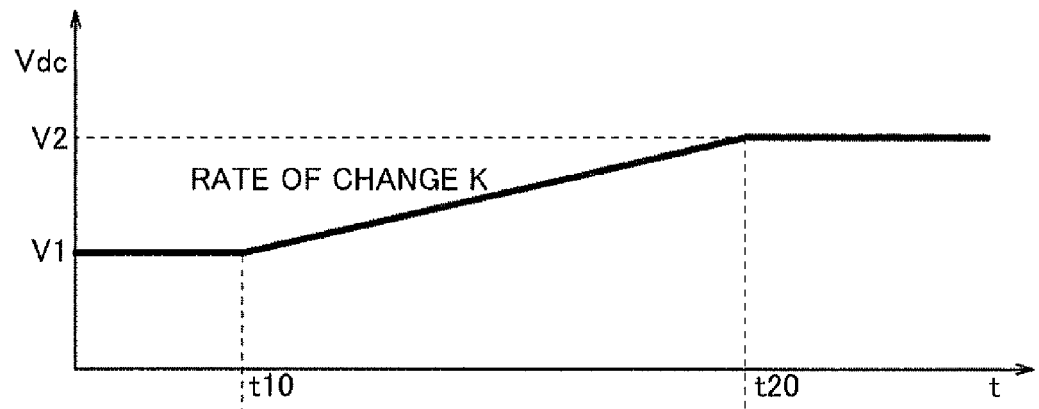
FIG. 8 is an illustrative view illustrating setting of a modification start timing and a modification end timing, which is executed in the voltage conversion control according to the first embodiment of the present invention.
Figure 8B:
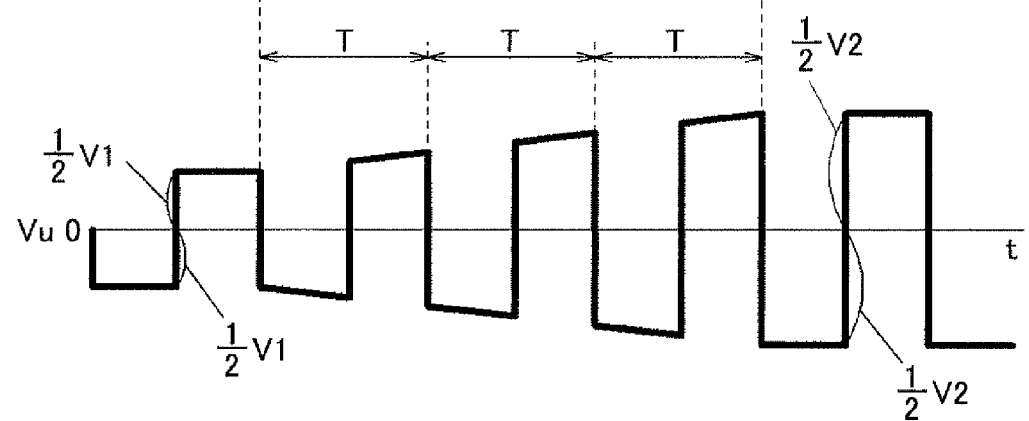

Next, voltage conversion control corresponding to the step #05 of the flowchart in FIG. 4 will be described in detail using FIGS. 7 and 8. Here, an example of control performed in a case where a current value of the system voltage Vdc is V1 and V2 (>V1) is applied as the system voltage command value Vdct will be described. Although omitted from the following description, the voltage conversion control can be performed similarly using the following procedures in a case where the system voltage Vdc is reduced. FIG. 7 is a flowchart showing the flow of the voltage conversion control. FIG. 8 is an illustrative view of the control executed during the voltage conversion control. FIG. 8A is a view showing temporal variation in the system voltage Vdc. FIG. 8B is a view showing temporal variation in the U phase voltage Vu supplied to the U phase coil, in which, similarly to FIG. 6B, the U phase voltage Vu is expressed using a half value (Vdc/2) of the system voltage Vdc at each point in time as a reference. Note that illustration of the V phase voltage Vv and the W phase voltage Vw has been omitted.

The voltage conversion control is performed by the voltage conversion control unit 31 when the converter 5 is caused to modify the system voltage Vdc. In this control, a modification start timing t10 for starting modification of the system voltage Vdc and a modification end timing t20 for ending modification of the system voltage Vdc are set, the rate of change K of the system voltage Vdc is calculated, and the converter 5 ON/OFF-controls the switching elements E1, E2 on the basis of the modification start timing t10, the modification end timing t20, and the rate of change K. More specifically, the voltage conversion control unit 31 sets the modification start timing t10 to match one of the ON/OFF timings of the switching elements E3 to E8 provided in the inverter 6, and sets the modification end timing t20 to match an ON/OFF timing, from among the ON/OFF timings of the switching elements E3 to E8 provided in the inverter 6, which differs from the modification start timing t10 by an integral multiple of the control period T. Operations of the voltage conversion control unit 31 will be described below in sequence following the flowchart shown in FIG. 7, with appropriate reference to FIG. 8.

First, the voltage conversion control unit 31 sets the modification start timing t10 (step #21). In the example of FIG. 8, the modification start timing t10 is set to match the high-low switch point, from among the high-low switch points of the U phase voltage Vu, at which the high level is switched to the low level. Furthermore, in this example, the start point of the initially set control period T is set to match the modification start timing t10. In so doing, the rectangular wave width adjustment control can be performed from the initial point at which modification of the system voltage Vdc begins, and as a result, generation of a torque ripple can be suppressed more reliably.

Next, the modification end timing t20 is set (step #22). In the example of FIG. 8, the modification end timing t20 is set to match the high-low switch point of the U phase voltage Vu following the elapse of a time corresponding to an integral multiple of a single electrical angle period (in this example, three times a single electrical angle period) from the modification start timing t10. By setting the modification end timing t20 in this manner, the start point of the first control period T can be aligned with the modification start timing t10 and the end point of the final control period T can be aligned with the modification end timing t20 in a case where a plurality of control periods T (three in this example) are set continuously between the modification start timing t10 and the modification end timing t20. Thus, the rectangular wave width adjustment control can be performed in all of the periods from the modification start timing t10 to the modification end timing t20, and as a result, generation of a torque ripple can be suppressed even more reliably.

Next, the rate of change K of the system voltage Vdc between the modification start timing t10 and the modification end timing t20 is calculated on the basis of V1, which is the current system voltage Vdc, V2, which is the system voltage command value Vdct, the modification start timing t10, and the modification end timing t20, using a following Equation (2) (step #23).

$$K(V2-V1)/(t20-t10) \quad (2)$$

The voltage conversion control unit 31 then outputs the calculated rate of change K of the system voltage Vdc to the switching control unit 30. Next, the voltage conversion control unit 31 sets the ON/OFF timings of the switching elements E1, E2 provided in the converter 5 (step #24) and ON/OFF-controls the switching elements E1, E2 (step #25) in order to vary the system voltage Vdc from V1 to V2 at the rate of change K between the set modification start timing t10 and modification end timing t20. Note that the ON/OFF timings of the switching elements E1, E2 are set using a well known method, and therefore detailed description of this method has been omitted.

Second Embodiment

Figure 9:
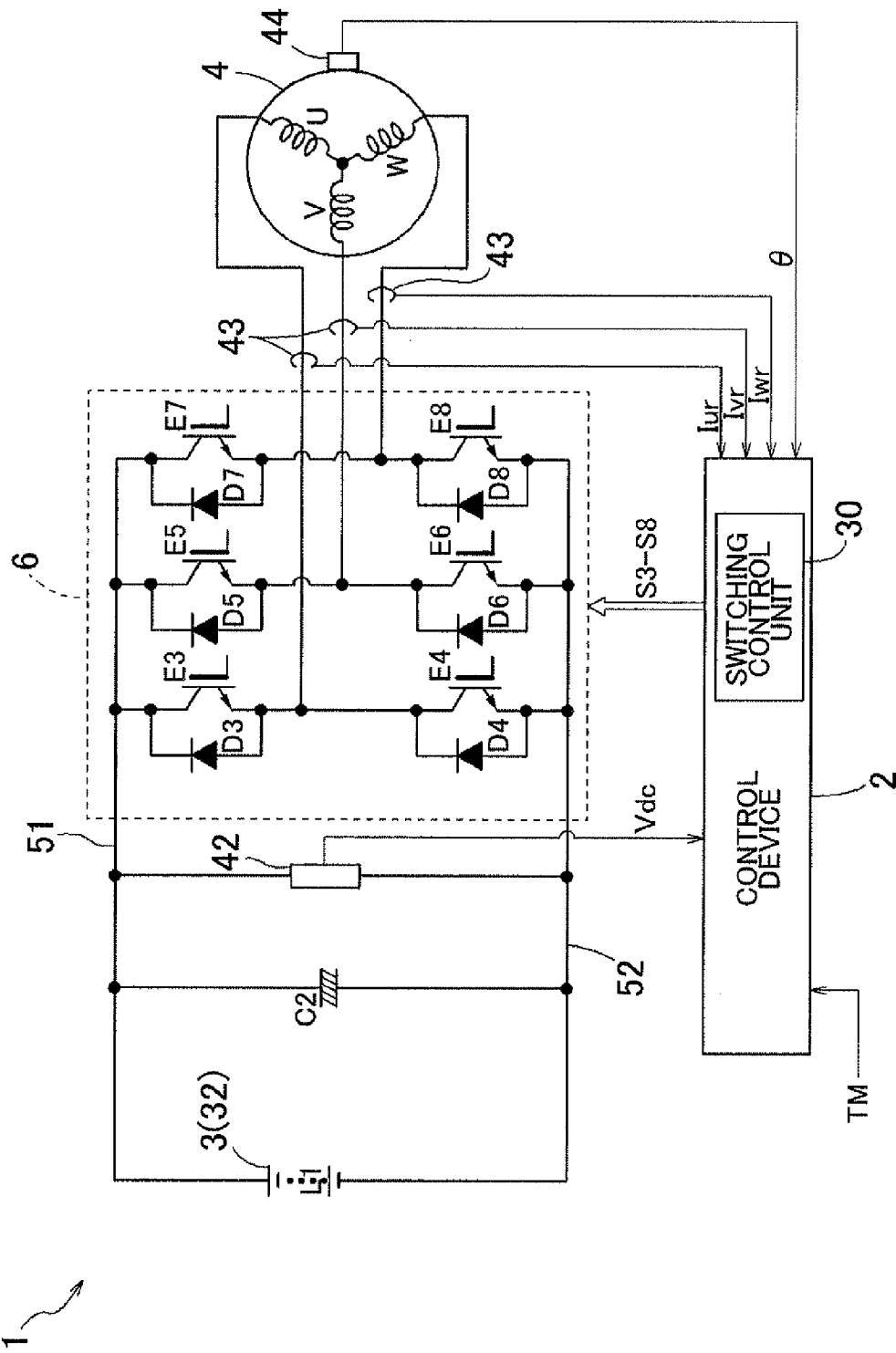
FIG. 9 is a circuit diagram showing the constitution of an electric motor driving apparatus according to a second embodiment of the present invention.

Next, a second embodiment of the present invention will be described. In the first embodiment, an example in which the system voltage generation unit 32 includes the converter 5 was described, but in this embodiment, as shown in FIG. 9, the system voltage generation unit 32 includes only the direct current power supply 3 and not the converter 5. Hence, in this embodiment, the inverter 6 is connected to the direct current power supply 3 without passing through the converter 5, and as a result, the system voltage Vdc corresponds to the output voltage of the direct current power supply 3. Further, the control device 2 includes the switching control unit 30 but not the voltage conversion control unit 31 of the first embodiment. The switching control unit 30 differs from that of the first embodiment in that it executes the rectangular wave width adjustment control without cooperating with the voltage conversion control unit 31. Moreover, the rate of change K of the system voltage Vdc is calculated from the system voltage Vdc detected by the system voltage sensor 42. Here, as shown in FIG. 9, the system voltage sensor 42 is disposed between the system voltage line 51 and the negative electrode line 52 of the inverter 6 and connected between the second smoothing capacitor C2 for smoothing the system voltage Vdc and the inverter 6, similarly to the first embodiment. Note that the control device 2 may process a power supply voltage detected by a power supply voltage sensor, not shown in the drawing, for detecting an inter-terminal voltage of the direct current power supply 3 as the system voltage Vdc. The control device 2 according to this embodiment will be described below focusing on differences with the first embodiment. Note that points not described in detail are assumed to be similar to the first embodiment.

Variation in the system voltage Vdc according to this embodiment will now be described. The direct current power supply 3 is constituted by a secondary battery, as noted above. A secondary battery has an internal resistance, and a terminal voltage increases or decreases relative to an electromotive force of the battery in accordance with this internal resistance. A magnitude of the voltage decrease or voltage increase is commensurate with a value obtained by multiplying a value of a flowing current by a value of the internal resistance. Hence, when power running or regeneration is underway in the electric motor 4 such that a discharge current or a charging current is generated in the direct current power supply 3, for example, the system voltage Vdc varies in accordance with the voltage decrease or voltage increase. The system voltage Vdc also varies when variation occurs in the discharge current or the charging current of the direct current power supply 3 due to an operation of another electrical load such as an electric motor connected to the direct current power supply 3. Further, the internal resistance increases in inverse proportion to the temperature of the battery. Therefore, the internal resistance increases when the temperature of the direct current power supply 3 is low, such as immediately after startup of the electric motor driving apparatus 1, for example, and therefore the system voltage Vdc is likely to vary greatly relative to the variation in the discharge current and charging current of the direct current power supply 3.

4. Operation of Control Device

In this embodiment, rectangular wave width adjustment control is performed on the basis of the rate of change K of the system voltage Vdc detected by the system voltage sensor 42. An overall operation of the control device 2 and the rectangular wave width adjustment control will be described in detail below, focusing on differences with the first embodiment.

4-1. Overall Operation

Figure 10:
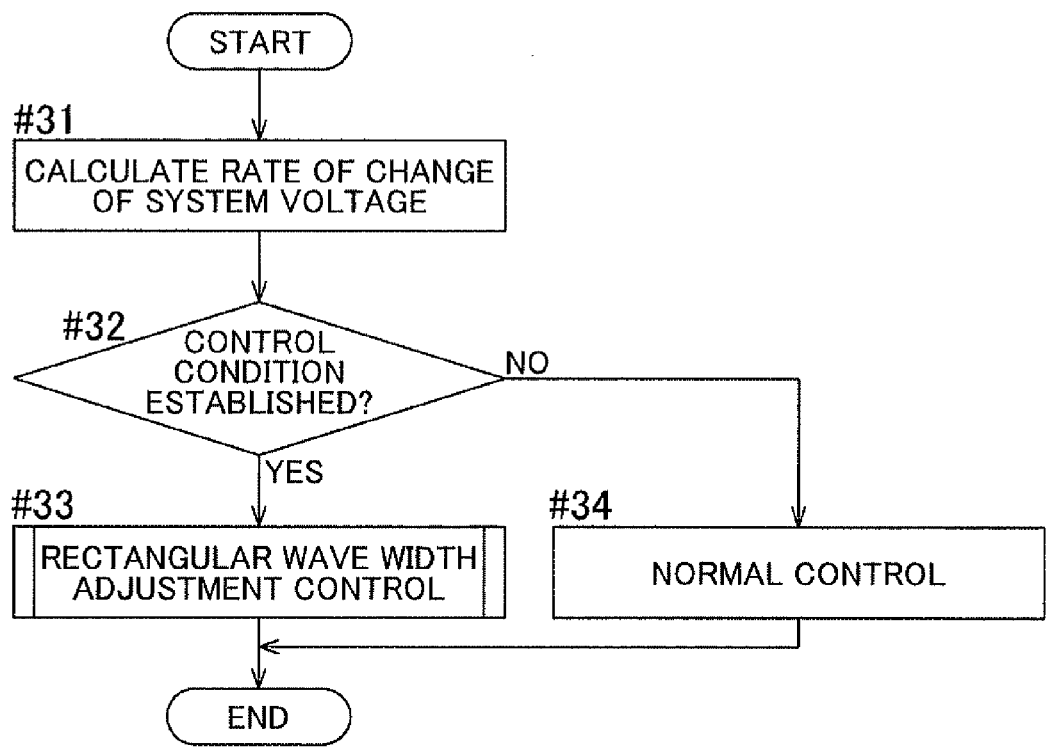
FIG. 10 is a flowchart showing a control flow of a control device according to the second embodiment of the present invention.

FIG. 10 is a flowchart showing the flow of an overall operation performed by the control device 2 according to this embodiment during rectangular wave control. Operations of the control device 2 will be described below in sequence, following the flowchart shown in FIG. 10. First, the control device 2 obtains the detected value of the system voltage Vdc and calculates the system voltage rate of change K (step #31). Here, the rate of change K of the system voltage Vdc is calculated on the basis of the value of the system voltage Vdc obtained in a current detection operation and a value of the system voltage Vdc obtained in a previous detection operation. The calculated rate of change K is a predicted value of the rate of change K throughout a subsequent control period T. For example, the rate of change K is calculated on the basis of a currently obtained value V0 of the system voltage Vdc, a previously obtained value Vo1 of the system voltage Vdc, and an interval ΔT1 between the previous acquisition and the current acquisition using a following Equation (3). Here, the value of the previously obtained system voltage Vdc and the acquisition interval are stored in a memory such as a RAM of the control device 2.

$$K=(V0-Vo1)/\Delta T1 \tag{3}$$

Acquisition of the system voltages Vdc and a calculation timing of the rate of change K are synchronized with the start point of the control period T of the rectangular wave control, for example. Note that the rate of change K may be calculated on the basis of values of system voltages Vdc obtained at a current time and a plurality of past times and the acquisition intervals therebetween using various arithmetic expressions. Further, the calculation timing does not have to be synchronized with the control period T and may be set in synchronization with a different predetermined period to the control period T, for example. Moreover, a value obtained by executing filter processing on the calculated rate of change K or the detected system voltage Vdc may be used as the rate of change K or the system voltage Vdc in other processing.

Next, the control device 2 determines whether or not a rectangular wave width adjustment control condition, which is a condition for executing the rectangular wave width adjustment control, is established (step #32). At this time, the control device 2 determines that the rectangular wave width adjustment control condition is established when variation in the system voltage Vdc is predicted. For example, the control device 2 determines that the rectangular wave width adjustment control condition is established when an absolute value of the rate of change K calculated in the step #31 equals or exceeds a predetermined threshold.

When it is determined that the rectangular wave width adjustment control is to be executed (step #32: Yes), the switching control unit 30 performs the rectangular wave width adjustment control (step #33). When it is determined that the rectangular wave width adjustment control is not to be executed (step #32: No), on the other hand, the aforementioned normal control is performed (step #34).

4-2. Rectangular Wave Width Adjustment Control

Next, the rectangular wave width adjustment control corresponding to the step #33 of the flowchart in FIG. 10 will be described. The rectangular wave width adjustment control according to this embodiment is similar to that of the first embodiment described using FIGS. 5 and 6 apart from the points to be described below. More specifically, the rate of change K obtained by the switching control unit 30 in the step #14 of FIG. 5 differs from the first embodiment in that in this embodiment, the predicted value of the rate of change K calculated in the step #31 of FIG. 10 on the basis of the value of the currently obtained system voltage Vdc and the value of the previously obtained system voltage Vdc is used as the rate of change K. In the rectangular wave width adjustment control, the ON/OFF timings of the switching elements E3 to E8 are then set in the step #15 of FIG. 5 on the basis of the predicted value of the rate of change K.

Even when the predicted value of the rate of change K, based on the value of the previously obtained system voltage Vdc, is used as the rate of change K, as in this embodiment, the ON/OFF timings of the switching elements E3 to E8 can be set such that the time-integrated values of the system voltages Vdc in the respective divided periods are substantially identical, similarly to the first embodiment, and therefore the time-integrated values of the rectangular wave-shaped voltages of the three phases within the control period T can be made substantially identical in each phase. As a result, disruption to the balance between the voltages Vu, Vv, Vw supplied to the coils of the respective phases during the control period T can be suppressed, thereby suppressing generation of a torque ripple. Hence, rectangular wave control can be performed while suppressing vibration in the alternating current electric motor even as the system voltage Vdc varies. As a result, the usage region of the low-switching loss rectangular wave control can be expanded, enabling an improvement in the efficiency of the electric motor driving apparatus 1.

4. Other Embodiments (1) In the above embodiments, an example in which the control period T is set at the length of a single electrical angle period was described. However, the embodiments of the present invention are not limited thereto, and in another preferred embodiment of the present invention, the control period T is set at a length corresponding to an integral multiple of a single electrical angle period, for example a length that is twice or three times a single electrical angle period.

(2) In the above embodiments, an example in which the modification start timing t10 at which modification of the system voltage Vdc begins is aligned with one of the ON/OFF timings of the switching elements E3 to E8 provided in the inverter 6 and the start point of the control period T is aligned with the modification start timing t10 was described. However, the embodiments of the present invention are not limited thereto, and in another preferred embodiment of the present invention, the start point of the control period T is aligned with a different ON/OFF timing of the switching elements E3 to E8 to the modification start timing t10 or not aligned with any of the ON/OFF timings of the switching elements E3 to E8. Furthermore, the modification start timing t10 need not be aligned with any of the ON/OFF timings.

(3) In the above embodiments, an example in which the modification end timing t20 at which modification of the system voltage Vdc ends is aligned with an ON/OFF timing, from among the ON/OFF timings of the switching elements E3 to E8 provided in the inverter, which differs from the modification start timing t10 by a timing three times a single electrical angle period was described. However, the embodiments of the present invention are not limited thereto, and in another preferred embodiment of the present invention, the modification end timing t20 is aligned with an ON/OFF timing that differs from the modification start timing t10 by an identical timing to a single electrical angle period or aligned with an ON/OFF timing that differs from the modification start timing t10 by an integral multiple of a single electrical angle period other than three times, for example twice or four times. Furthermore, the modification end timing t20 may be aligned with an ON/OFF timing other than an ON/OFF timing that differs from the modification start timing t10 by an integral multiple of a single electrical angle period or not aligned with any of the ON/OFF timings.

(4) In the above embodiments, an example in which the switching control unit 30 sets the ON/OFF timings of the switching elements E3 to E8 during the rectangular wave width adjustment control such that the time-integrated values of the system voltages Vdc in the respective divided periods are substantially identical was described. However, the embodiments of the present invention are not limited thereto, and in another preferred embodiment of the present invention, the ON/OFF timings of the switching elements E3 to E8 are set such that the time-integrated values of the rectangular wave-shaped voltages of the respective phases within the control period T are substantially identical in each phase on the basis of the rate of change K of the system voltage Vdc, without taking the time-integrated value of the system voltage Vdc into account. More specifically, the high-low switch point of the U phase voltage Vu, the high-low switch point of the V phase voltage Vv, and the high-low switch point of the W phase voltage Vw may be set individually such that the time-integrated values of the rectangular wave-shaped voltages within the control period T are substantially identical in each phase. Note that in this case, the start point of the control period T does not have to be aligned with any of the high-low switch points.

(5) In the above embodiments, an example in which the times t1 to t5 at which the surface areas s1 to s6 shown in FIG. 6A become equal to each other are calculated on the basis of Equation (1) was described. However, the embodiments of the present invention are not limited thereto, and the times t1 to t5 may be calculated on the basis of a following Equation (3).

$$\{Vn+K\times\Delta tn/2\}\times 66\ tn\times 6=(V0+K\times T/2)\times T \quad (3)$$

Here, Vn is the system voltage Vdc at the time tn, and Δtn is a difference between the time tn and the next time. In other words, with this constitution, the subsequent time to the time tn is calculated on the basis of the value Vn of the system voltage Vdc at the time tn in addition to the value V0 of the system voltage Vdc at the start point t0 of the control period T, the length of the control period T, and the rate of change K of the system voltage Vdc during the control period T. Note that Vn cannot be determined unless the time tn is set, and therefore, with this constitution, the times t1, t2, t3, t4, t5 are calculated in that order.

(6) In the first embodiment, an example in which the system voltage Vdc varies at the constant rate of change K during the control period T was described. However, the embodiments of the present invention are not limited thereto, and as long as temporal variation in the rate of change K (temporal variation in the system voltage Vdc) during the control period T is known in advance, the rectangular wave width adjustment control can be performed during the control period T. In this case, the ON/OFF timings of the switching elements E3 to E8 can be set by calculating the time-integrated values of the system voltages Vdc and the rectangular wave-shaped voltages Vu, Vv, Vw of the respective phases on the basis of the temporal variation in the rate of change K, i.e. without calculating the surface areas as in the above embodiment.

(7) In the first embodiment, an example in which the electric motor driving apparatus 1 includes, as a voltage conversion unit, the boost converter 5 for generating the system voltage Vdc by boosting the power supply voltage Vb was described. However, the present invention is not limited to this embodiment and may be applied to an electric motor driving apparatus 1 having various types of voltage conversion units for generating the desired system voltage Vdc by converting the power supply voltage Vb from the direct current power supply 3. Hence, in another preferred embodiment of the present invention, the electric motor driving apparatus 1 includes a step-up/step-down converter that both boosts and reduces the power supply voltage Vb or a step-down converter that reduces the power supply voltage Vb, for example, as the voltage conversion unit.

(8) In the above embodiments, an example in which the alternating current electric motor 4 is a synchronous electric motor having an embedded magnet structure (an IPMSM), which is operated by a three-phase alternating current, was described. However, the embodiments of the present invention are not limited thereto, and a synchronous electric motor having a surface magnet structure (an SPMSM) or an electric motor other than a synchronous electric motor, for example an induction electric motor, may be used as the alternating current electric motor 4, for example. Further, an alternating current other than a three-phase alternating current, such as a single phase alternating current or a multiple phase alternating current having two phases, four phases, or more may be used as the alternating current supplied to the alternating current electric motor.

(9) In the above embodiments, an example in which the electric motor 4 is used as a drive power source for an electric vehicle, a hybrid vehicle, or the like was described. However, the electric motor 4 according to the above embodiments is not limited to this application, and the present invention may be applied to an electric motor for any application.

(10) In the first embodiment, an example in which the switching control unit 30 obtains the rate of change K of the system voltage Vdc, calculated by the voltage conversion control unit 31, in the step #14 of FIG. 5 was described. However, the embodiments of the present invention are not limited thereto, and in another preferred embodiment of the present invention, the switching control unit 30 calculates a predicted value of the rate of change K in the first embodiment on the basis of the value of a system voltage Vdc actually obtained in the past, as in the processing described in the step #31 of FIG. 10 in the second embodiment. In this case, the switching control unit 30 obtains the predicted value of the calculated rate of change K as the rate of change K in the step #14 of FIG. 5, and sets the ON/OFF timings of the switching elements on the bass of the obtained predicted value of the rate of change K in the step #15 of FIG. 5.

(11) In the second embodiment, an example in which the system voltage generation unit 32 does not include the converter 5 and the control device 2 does not include the voltage conversion control unit 31 was described. However, the embodiments of the present invention are not limited thereto, and in the second embodiment, similarly to the first embodiment shown in FIG. 1, the system voltage generation unit 32 may include the converter 5 and the control device 2 may include the voltage conversion control unit 31. Accordingly, in another preferred embodiment of the present invention, when the voltage conversion control unit 31 does not execute boosting or reducing voltage conversion control such that the system voltage corresponds to the output voltage of the direct current power supply 3, the switching control unit 30 executes the rectangular wave width adjustment control according to the second embodiment.

The present invention can be used favorably in a control device that controls an electric motor driving apparatus for driving an alternating current electric motor.

The invention claimed is:

1. A control device for an electric motor driving apparatus, which performs control on an electric motor driving apparatus including a system voltage generation unit for generating a direct current system voltage and a direct current-alternating current conversion unit for converting the system voltage into an alternating current voltage having a plurality of mutually deviating phases and supplying the alternating current voltage to an alternating current electric motor, comprising:
   a switching control unit for performing rectangular wave control in which a plurality of switching elements provided in the direct current-alternating current conversion unit are ON/OFF-controlled to output rectangular wave-shaped voltages of a plurality of phases, wherein
   when the system voltage varies during execution of the rectangular wave control, the switching control unit performs rectangular wave width adjustment control to set ON/OFF timings of the plurality of switching elements on the basis of a rate of change of the system voltage such that time-integrated values of the rectangular wave-shaped voltages of the respective phases within a control period set at a length corresponding to an integral multiple of a single electrical angle period are substantially identical among the respective phases.

2. The control device for an electric motor driving apparatus according to claim 1, wherein points at which voltage values of the rectangular wave-shaped voltages of the respective phases are switched between a high level and a low level by switching the plurality of switching elements ON and OFF are set as high-low switch points,
   the switching control unit aligns a start point of the control period with one of the high-low switch points,
   periods set by dividing the control period using the respective high-low switch points of the rectangular wave-shaped voltages of the plurality of phases as dividing points are set as divided periods, and
   in the rectangular wave width adjustment control, the ON/OFF timings of the plurality of switching elements are set on the basis of the length of the control period, a value of the system voltage at the start point of the control period, and the rate of change of the system voltage within the control period such that time-integrated values of the system voltage in the respective divided periods are substantially identical.

3. The control device for an electric motor driving apparatus according to claim 2, wherein the system voltage generation unit includes a voltage conversion unit that generates a desired system voltage by converting a power supply voltage from a direct current power supply,
   the control device further comprises a voltage conversion control unit that obtains a system voltage command value, which is a command value of the system voltage generated by the voltage conversion unit, and ON/OFF-controls a switching element provided in the voltage conversion unit on the basis of the system voltage command value,
   when the voltage conversion unit is caused to modify the system voltage, the voltage conversion control unit aligns a modification start timing at which modification of the system voltage is started with one of the ON/OFF timings of the plurality of switching elements provided in the direct current-alternating current conversion unit, and
   the switching control unit aligns the start point of the control period with the modification start timing.

4. The control device for an electric motor driving apparatus according to claim 3, wherein the voltage conversion control unit aligns a modification end timing at which modification of the system voltage ends with an ON/OFF timing, from among the ON/OFF timings of the plurality of switching elements provided in the direct current-alternating current conversion unit, that differs from the modification start timing by an integral multiple of a single electrical angle period.

5. The control device for an electric motor driving apparatus according to claim 2, wherein the system voltage is an output voltage of a direct current power supply, and
   the rate of change of the system voltage is calculated on the basis of a value of the system voltage at the start point of the control period and a value of the system voltage prior to the start point of the control period.

6. The control device for an electric motor driving apparatus according to claim 1, wherein the system voltage generation unit includes a voltage conversion unit that generates a desired system voltage by converting a power supply voltage from a direct current power supply,
   the control device further comprises a voltage conversion control unit that obtains a system voltage command value, which is a command value of the system voltage generated by the voltage conversion unit, and ON/OFF-controls a switching element provided in the voltage conversion unit on the basis of the system voltage command value,
   when the voltage conversion unit is caused to modify the system voltage, the voltage conversion control unit aligns a modification start timing at which modification of the system voltage is started with one of the ON/OFF timings of the plurality of switching elements provided in the direct current-alternating current conversion unit, and
   the switching control unit aligns the start point of the control period with the modification start timing.

7. The control device for an electric motor driving apparatus according to claim 6, wherein the voltage conversion control unit aligns a modification end timing at which modification of the system voltage ends with an ON/OFF timing, from among the ON/OFF timings of the plurality of switching elements provided in the direct current-alternating current conversion unit, that differs from the modification start timing by an integral multiple of a single electrical angle period.

8. The control device for an electric motor driving apparatus according to claim 1, wherein the system voltage is an output voltage of a direct current power supply, and
   the rate of change of the system voltage is calculated on the basis of a value of the system voltage at the start point of the control period and a value of the system voltage prior to the start point of the control period.

* * * * *